(12) United States Patent
Hagiwara

(10) Patent No.: US 7,135,862 B2
(45) Date of Patent: Nov. 14, 2006

(54) NMR LOGGING USING TIME-DOMAIN AVERAGING

(75) Inventor: Teruhiko Hagiwara, Houston, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 23 days.

(21) Appl. No.: 09/803,819

(22) Filed: Mar. 13, 2001

(65) Prior Publication Data

US 2002/0163334 A1    Nov. 7, 2002

(51) Int. Cl.
*G01V 3/00* (2006.01)
(52) U.S. Cl. ...................................................... 324/303
(58) Field of Classification Search ................ 324/300, 324/303, 307, 309, 314; 702/79, 179
See application file for complete search history.

(56) References Cited

U.S. PATENT DOCUMENTS

| | | | | |
|---|---|---|---|---|
| 2,702,367 A | * | 2/1955 | Ergen | 377/44 |
| 2,912,641 A | | 11/1959 | Ruble | |
| 3,213,357 A | | 10/1965 | Brown et al. | |
| 3,231,356 A | * | 1/1966 | Brown et al. | 65/184 |
| 3,402,344 A | | 9/1968 | Brown et al. | |
| 3,617,867 A | | 11/1971 | Herzog | 324/0.5 |
| 3,638,484 A | | 2/1972 | Tixier | 73/152 |
| 3,667,035 A | | 5/1972 | Slichter | 324/0.5 R |
| 3,881,651 A | * | 5/1975 | Wilhelm, Jr. | 700/34 |
| 4,389,613 A | * | 6/1983 | Brown | 324/303 |
| 4,412,178 A | * | 10/1983 | Brown | 324/303 |
| 4,412,179 A | * | 10/1983 | Brown | 324/303 |
| 4,536,714 A | | 8/1985 | Clark | 324/338 |
| 4,710,713 A | | 12/1987 | Strikman | 324/303 |
| 4,717,876 A | | 1/1988 | Masi et al. | 324/303 |
| 4,717,877 A | | 1/1988 | Taicher et al. | 324/303 |
| 4,717,878 A | | 1/1988 | Taicher et al. | 324/303 |
| 4,728,892 A | | 3/1988 | Vinegar et al. | 324/309 |
| 4,933,638 A | | 6/1990 | Kenyon et al. | 324/303 |
| 4,939,648 A | | 7/1990 | O'Neill et al. | 364/422 |
| 5,023,551 A | | 6/1991 | Kleinberg et al. | 324/303 |
| 5,055,787 A | | 10/1991 | Kleinberg et al. | 324/303 |
| 5,055,788 A | | 10/1991 | Kleinberg et al. | 324/303 |
| 5,122,746 A | | 6/1992 | King et al. | 324/307 |
| 5,212,447 A | | 5/1993 | Paltiel | 324/300 |
| 5,280,243 A | | 1/1994 | Miller | 324/303 |
| 5,291,137 A | | 3/1994 | Freedman | 324/303 |
| 5,309,098 A | | 5/1994 | Coates et al. | 324/303 |
| 5,350,925 A | | 9/1994 | Watson | 250/269.3 |

(Continued)

FOREIGN PATENT DOCUMENTS

EP     0 649 035 B1     4/1995

(Continued)

OTHER PUBLICATIONS

Akkurt et al., "Selection of Optimal Acquisition Parameters for MRIL Logs," SPWLA 37th Annual Logging Symposium, Jun. 16-19, 1996.

(Continued)

*Primary Examiner*—Diego Gutierrez
*Assistant Examiner*—Dixomara Vargas
(74) *Attorney, Agent, or Firm*—Jones Day

(57) ABSTRACT

Method for data acquisition and processing, which uses time-domain averaging to increase the signal to noise ratio (SNR) in single-event measurements. In a preferred embodiment, NMR echo-trains obtained using high-speed NMR logging are provided, the echo trains are time-domain averaged, preferably in real-time, over one or more time intervals to sharpen the spatial resolution of the logging tool and/or to increase the signal to noise ratio (SNR) of the data train.

21 Claims, 8 Drawing Sheets

Time-domain averaged echo-train data.

U.S. PATENT DOCUMENTS

| | | | |
|---|---|---|---|
| 5,363,041 A | | 11/1994 | Sezginer .................... 324/303 |
| 5,381,092 A | | 1/1995 | Freedman .................. 324/303 |
| 5,412,320 A | | 5/1995 | Coates ....................... 324/303 |
| 5,486,762 A | | 1/1996 | Freedman et al. .......... 324/303 |
| 5,497,087 A | | 3/1996 | Vinegar et al. ............. 324/303 |
| 5,498,960 A | | 3/1996 | Vinegar et al. ............. 324/303 |
| 5,517,115 A | * | 5/1996 | Prammer .................... 324/303 |
| 5,557,200 A | | 9/1996 | Coates ....................... 324/303 |
| 5,557,201 A | | 9/1996 | Kleinberg et al. .......... 324/303 |
| 5,680,043 A | | 10/1997 | Hurlimann et al. ......... 324/303 |
| 5,696,448 A | | 12/1997 | Coates et al. ............... 324/303 |
| 5,698,979 A | * | 12/1997 | Taicher et al. .............. 324/303 |
| 5,705,927 A | | 1/1998 | Sezginer et al. ............ 324/303 |
| 5,936,405 A | | 8/1999 | Prammer et al. ........... 324/303 |
| 6,005,389 A | * | 12/1999 | Prammer .................... 324/303 |
| 6,023,164 A | | 2/2000 | Prammer .................... 324/303 |
| 6,051,973 A | | 4/2000 | Prammer .................... 324/303 |
| 6,107,796 A | | 8/2000 | Prammer .................... 324/303 |
| 6,111,408 A | | 8/2000 | Blades et al. ............... 324/303 |
| 6,115,671 A | | 9/2000 | Fordham et al. ............... 702/8 |
| 6,121,774 A | * | 9/2000 | Sun et al. .................... 324/303 |
| 6,133,734 A | | 10/2000 | McKeon ..................... 324/303 |
| 6,140,817 A | | 10/2000 | Flaum et al. ................ 324/303 |
| 6,163,153 A | * | 12/2000 | Reiderman et al. ......... 324/314 |
| 6,366,088 B1 | * | 4/2002 | Hagiwara .................... 324/303 |
| 6,385,548 B1 | * | 5/2002 | Ananthaiyer et al. ......... 702/73 |
| 6,452,389 B1 | * | 9/2002 | Edwards ..................... 324/303 |
| 6,459,263 B1 | * | 10/2002 | Hawkes et al. ............. 324/303 |
| 6,541,969 B1 | * | 4/2003 | Sigal et al. .................. 324/303 |
| 6,600,315 B1 | * | 7/2003 | Heaton et al. ............... 324/303 |
| 2001/0033163 A1 | * | 10/2001 | Sigal et al. .................. 324/312 |

FOREIGN PATENT DOCUMENTS

| | | |
|---|---|---|
| GB | 2 056 082 A | 7/1980 |
| WO | WO 98/25164 | 6/1998 |

OTHER PUBLICATIONS

Akkurt et al., "NMR Logging of Natural Gas Reservoirs," SPWLA 36th Annual Logging Symposium (Jun. 26-29, 1995).

Brown et al., "Nuclear Magnetism Logging," Transactions of the American Institute of Mining, Metallurgical, and Petroleum Engineers, vol. 219 (1960), pp. 199-207.

Cannon et al., "Quantitative NMR Interpretation," Society of Petroleum Engineers, SPE 49010, 1998.

Chandler et al., "Improved Log Quality with a Dual-Frequency Pulsed NMR Tool," *Society of Petroleum Engineers* (1994) pp. 23-35.

Chen et al., "Improving the Accuracy of NMR Relaxation Distribution Analysis in Clay-Rich Reservoirs and Core Samples," paper SCA 9702, in 1997 international symposium proceedings: Society of Professional Well Log Analysts, Society of Core Analysts Chapter-at-large, p. 10, 1997.

Chen et al., "Estimation of Hydrocarbon Viscosity with Multiple TE Dual Wait-Time MRIL Logs," Society of Petroleum Engineers, SPE 49009, 1998.

Edwards et al., "Improved NMR Well Logs From Time-Dependent Echo Filtering," SPWLA 37th Annual Logging Symposium, Jun. 16-19, 1996.

Gallegos et al., "A NMR Technique for the Analysis of Pore Structure: Determination of Continuous Pore Size Distributions," Journal of Colloid and Interface Science, vol. 122, No. 1, Mar. 1988, pp. 143-153.

Hou et al., "Nuclear Magnetic Resonance Logging Methods for Fluid Typing," Society of Petroleum Engineers, Inc., SPE 48896, 1998.

Hull et al., "Field Examples of Nuclear Magnetism Logging," Journal of Petroleum Technology, 1960, pp. 14-22.

Jackson et al., "Western Gas Sands Project Los Alamos NMR Well Logging Tool Development," Los Alamos National Laboratory (Oct. 1981-Sep. 1982) pp. 1-28.

Jackson et al., "Nuclear Magnetic Resonance Well Logging," The Log Analyst, Sep.-Oct. 1984, pp. 16-30.

Kenyon et al., "Pore-Size Distribution and NMR in Microporous Cherty Sandstones," SPWLA Thirtieth Annual Logging Symposium (Jun. 11-14, 1989), pp. 1-24.

Kleinberg et al., "Novel NMR Apparatus for Investigating an External Sample," *Journal of Magnetic Resonance*, (1992) pp. 466-485.

Kleinberg et al., "Nuclear Magnetic Resonance of Rocks: $T_1$ vs. $T_2$," Society of Petroleum Engineers, SPE 26470, 1993, pp. 553-563.

Kleinberg et al., "NMR Properties of Reservoir Fluids," The Log Analyst, Nov.-Dec. 1996, pp. 20-32.

Menger et al., "A New Algorithm for Analysis of NMR Logging Data," Society of Petroleum Engineers, Inc., SPE 49013, 1998.

Miller et al., "Spin Echo Magnetic Resonance Logging: Porosity and Free Fluid Index Determination," *Society of Petroleum Engineers*, SPE 20561 (1990), pp. 321-334.

Morriss et al., "Field Test of an Experimental Pulsed Nuclear Magnetism Tool," SPWLA Annual Logging Symposium (Jun. 13-16, 1993), pp. 1-23.

Prammer et al., "Theory and Operation of a New, Multi-Volume, NMR Logging System," SPWLA 40th Annual Logging Symposium, May 30-Jun. 3, 1999.

Prammer et al., "A New Multiband Generation of NMR Logging Tools," Society of Petroleum Engineers, SPE 49011, 1998.

Prammer et al., "Measurements of Clay-Bound Water and Total Porosity by Magnetic Resonance Logging," Society of Petroleum Engineers, SPE 36522, 1996.

Prammer, M.G., "NMR Pore Size Distributions and Permeability at the Well Site," *Society of Petroleum Engineers*, SPE 28368, (1994) pp. 55-64.

*Schlumberger Technology News—Oilfield Bulletin*, "Fifth Generation Nuclear Magnetic Resonance Logging Tool: A Major Advance in Producibility Measurement Technology," (Jul. 1995) (2 pp.).

*Schlumberger Wireline & Testing*, "Combinable Magnetic Resonance tool reliably indicates water-free production and reveals hard-to-find pay zones," (Jun. 1995).

Singer et al., "Fast NMR Logging for Bound Fluid and Permeability," SPWLA 38th Annual Logging Symposium, Jun. 15-18, 1997.

* cited by examiner

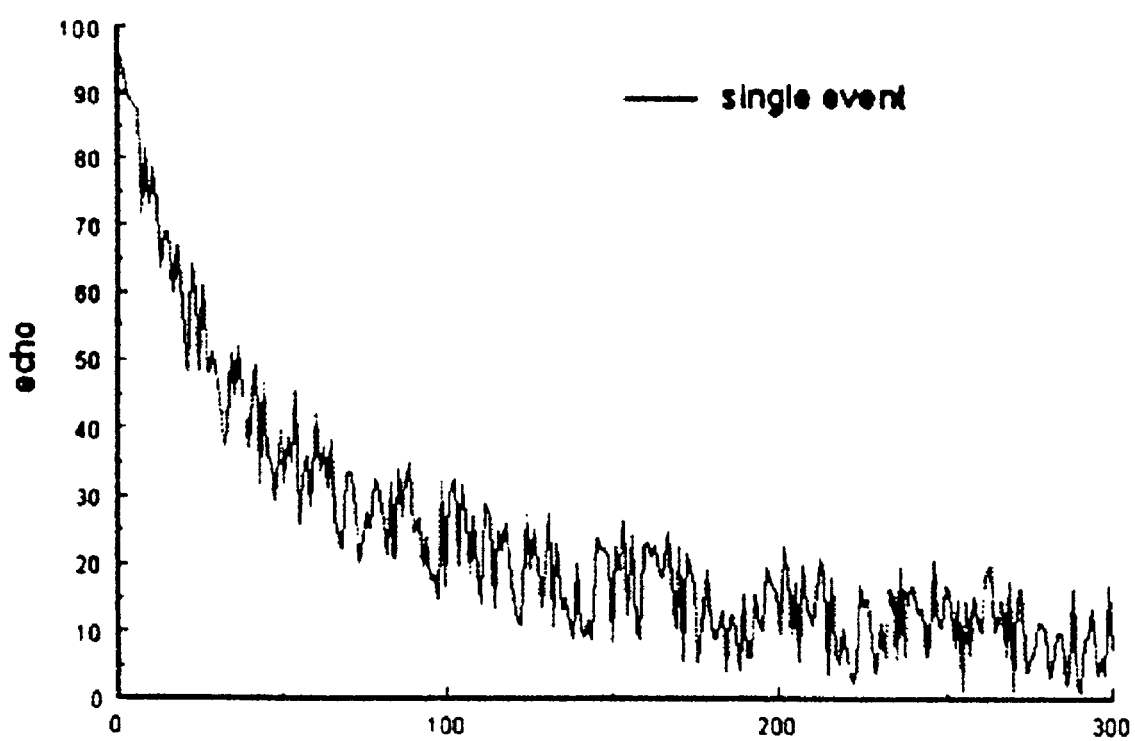
Fig1. Single event echo-train

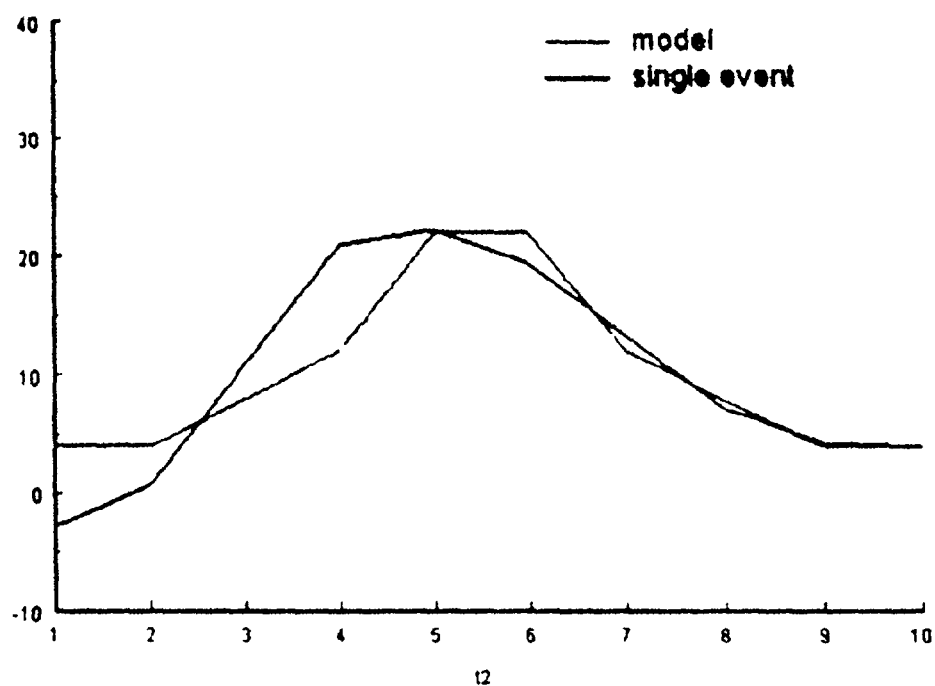
Fig.2 Model T₂ distribution and Inverted T₂ distribution from single echo-train data.

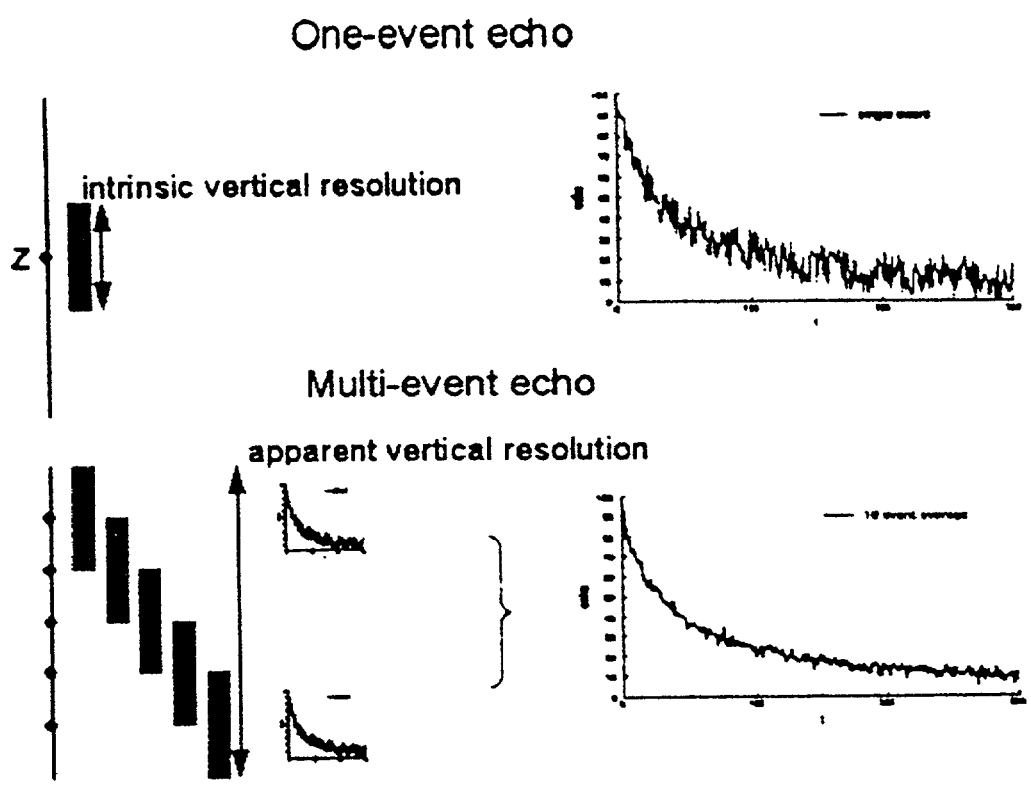
Fig.3 Multi-event echo stacking

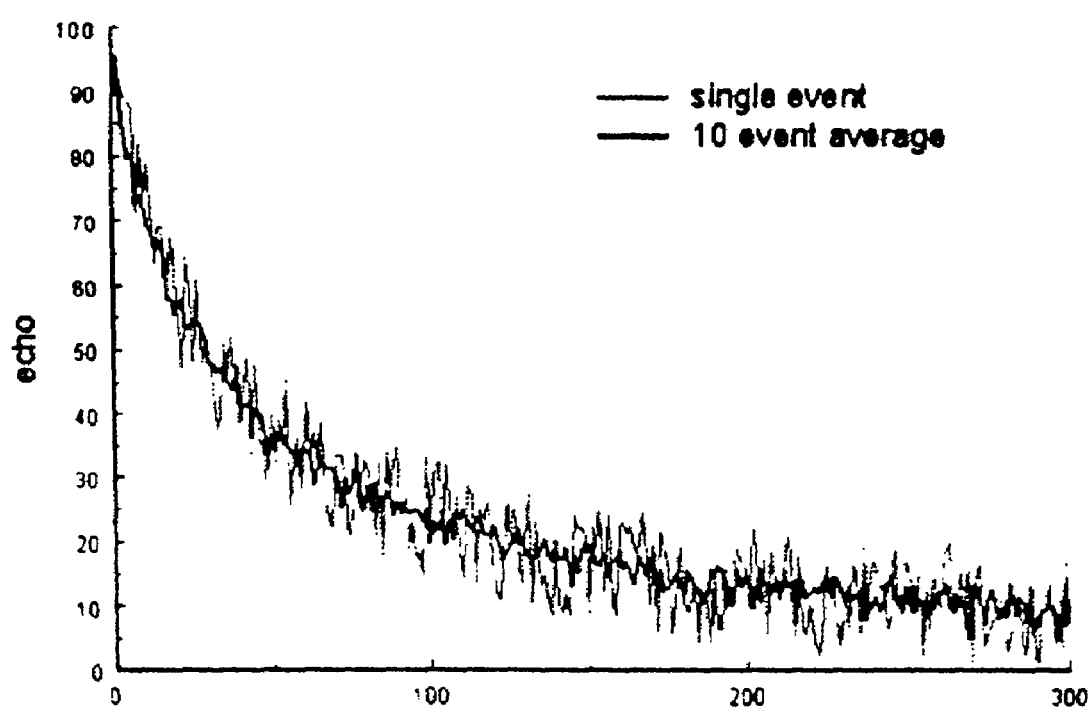
Fig.4 Stacked echo-train from 10 events

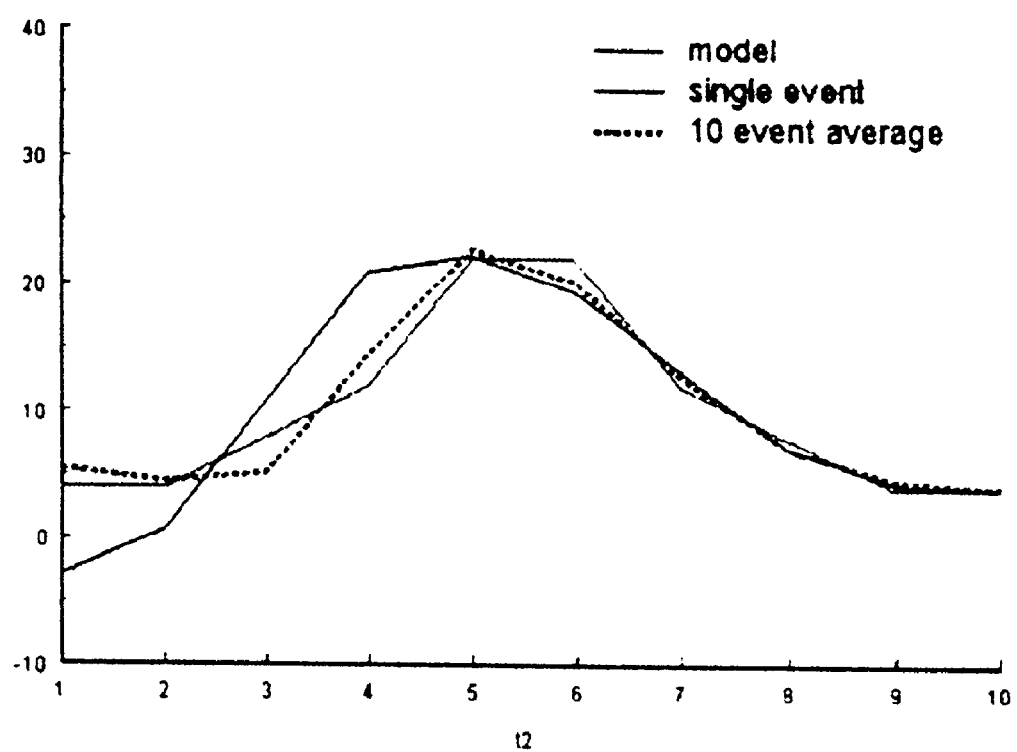
Fig.5 Inverted $T_2$ distribution from stacked echo-train data.

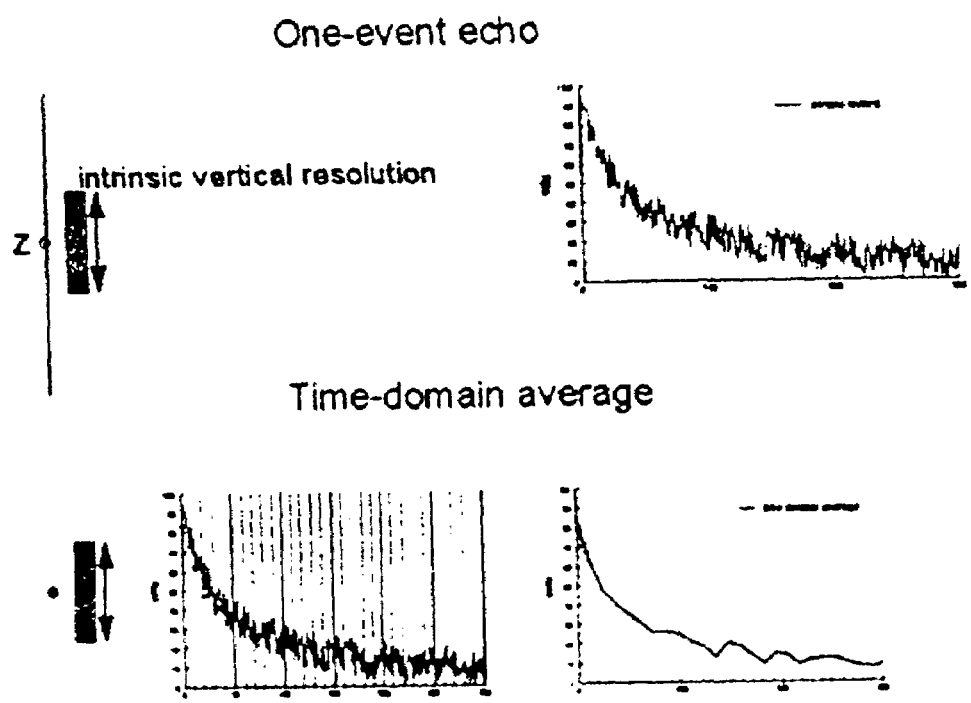
Fig.6 Time-domain average

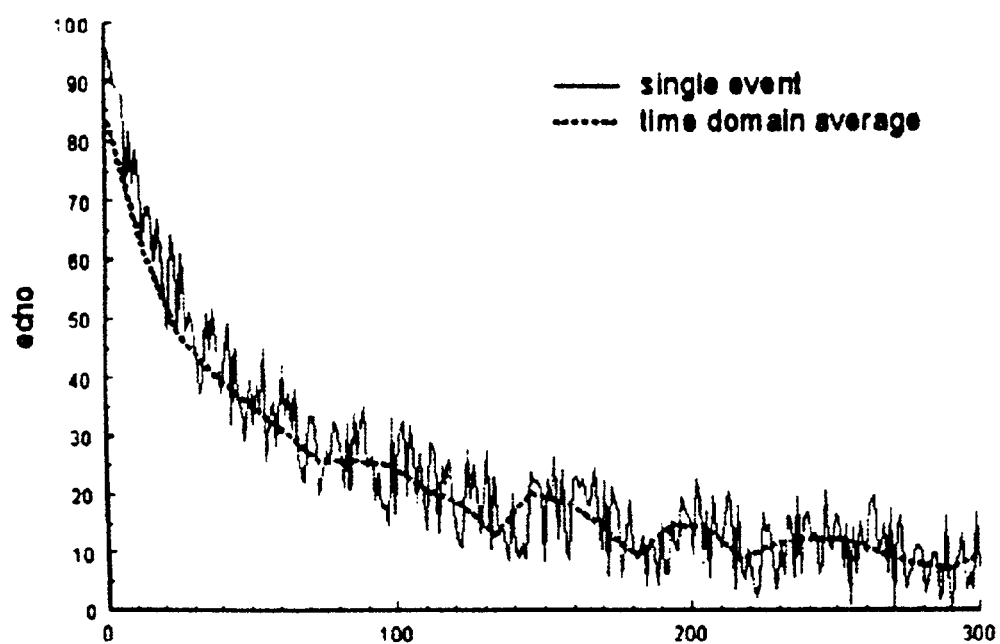
Fig.7 Time-domain averaged echo-train data.

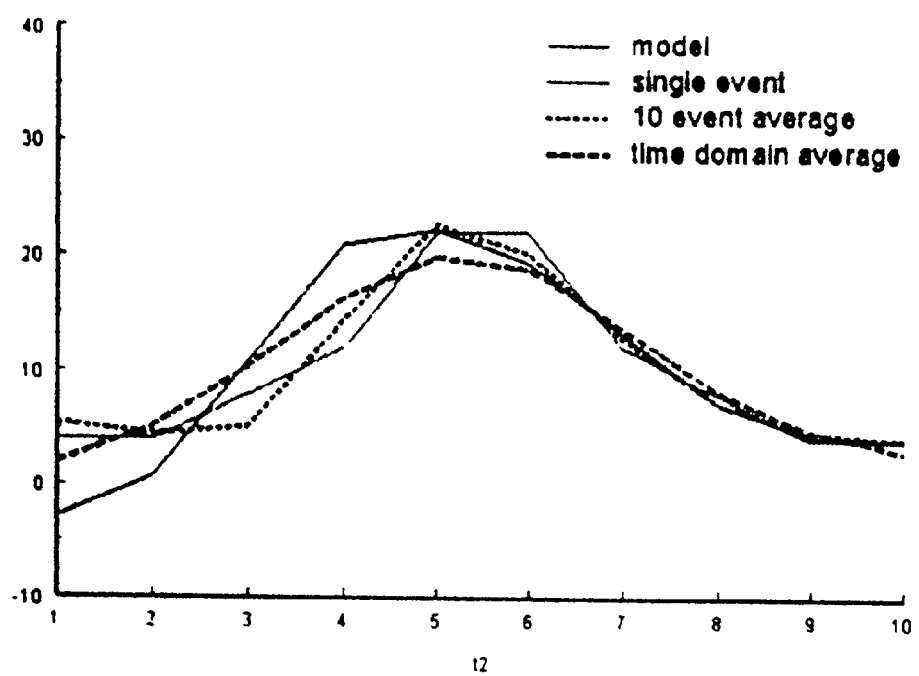
Fig. 8 Inverted $T_2$ distribution from time-domain averaged echo-train.

NMR LOGGING USING TIME-DOMAIN AVERAGING

FIELD OF THE INVENTION

The present invention concerns logging applications and more specifically relates to a method for data acquisition and processing, which uses time-domain averaging to increase the signal to noise ratio (SNR) or to sharpen the spatial resolution of the obtained logging data. In an exemplary application, the method is used in nuclear magnetic resonance (NMR) logging to increase the SNR of single event echo-train for high-speed NMR logging and/or to sharpen the spatial resolution of the received data.

BACKGROUND OF THE INVENTION

In oil and gas exploration it is desirable to understand the structure and properties of the geological formation surrounding a borehole, in order to determine if the formation contains hydrocarbon resources (oil and/or gas), to estimate the amount and producibility of hydrocarbon contained in the formation, and to evaluate the best options for completing the well in production. A significant aid in this evaluation is the use of wireline logging and/or logging-while-drilling (LWD) measurements of the formation surrounding the borehole (referred to collectively as "logs" or "log measurements"). Typically, one or more logging tools are lowered into the borehole and the tool readings or measurement logs are recorded as the tools traverse the borehole. These measurement logs are used to infer the desired formation properties.

In recent years nuclear magnetic resonance (NMR) logging has become very important for purposes of formation evaluation and is one of the preferred methods for determining formation parameters. Improvements in the NMR logging tools, as well as advances in data analysis and interpretation allow log analysts to generate detailed reservoir description reports, including clay-bound and capillary-bound related porosity, estimates of the amounts of bound and free fluids, fluid types (i.e., oil, gas and water), permeability and other properties of interest.

NMR tools used in practical applications include, for example, the centralized MRIL® tool made by NUMAR Corporation, a Halliburton company, and the sidewall CMR tool made by Schlumberger. The MRIL® tool is described, for example, in U.S. Pat. No. 4,710,713 to Taicher et al. and in various other publications including: "Spin Echo Magnetic Resonance Logging: Porosity and Free Fluid Index Determination," by Miller, Paltiel, Gillen, Granot and Bouton, SPE 20561, 65th Annual Technical Conference of the SPE, New Orleans, La., Sep. 23–26, 1990; "Improved Log Quality With a Dual-Frequency Pulsed NMR Tool," by Chandler, Drack, Miller and Prammer, SPE 28365, 69th Annual Technical Conference of the SPE, New Orleans, La., Sep. 25–28, 1994. Certain details of the structure and the use of the MRIL® tool, as well as the interpretation of various measurement parameters are also discussed in U.S. Pat. Nos. 4,717,876; 4,717,877; 4,717,878; 5,212,447; 5,280,243; 5,309,098; 5,412,320; 5,517,115; 5,557,200; 5,696,448; 5,936,405; 6,005,389; 6,023,164; 6,051,973; 6,107,796 and 6,111,408. The structure and operation of the Schlumberger CMR tool is described, for example, in U.S. Pat. Nos. 4,939,648; 5,055,787 and 5,055,788 and further in "Novel NMR Apparatus for Investigating an External Sample," by Kleinberg, Sezginer and Griffin, J. Magn. Reson. 97, 466–485, 1992; and "An Improved NMR Tool Design for Faster Logging," D. McKeon et al., SPWLA 40th Annual Logging Symposium, May–June 1999. The content of the above patents is hereby expressly incorporated by reference for all purposes, and all non-patent references are incorporated by reference for background.

NMR tools of the type discussed above generally measure the time for hydrogen nuclei present in the earth formation to realign their spin axes, and consequently their bulk magnetization, either with an externally applied magnetic field, or perpendicularly to the magnetic field, after momentary reorientation due to the application of specific radio frequency (RF) pulses. The externally applied magnetic field is typically provided by a magnet disposed in the tool. The spin axes of the hydrogen nuclei in the earth formation are, in the aggregate, caused to be aligned with the magnetic field induced in the earth formation by the magnet. The NMR tool includes an antenna positioned near the magnet and shaped so that a pulse of radio frequency (RF) power conducted through the antenna induces a magnetic field in the earth formation orthogonal to the field induced by the magnet. The RF pulse has a duration predetermined so that the spin axes of the hydrogen nuclei generally align themselves perpendicular both to the orthogonal magnetic field induced by the RF pulse and to the externally applied magnetic field. After the pulse ends, the nuclear magnetic moment of the hydrogen nuclei gradually relax, i.e., return to their alignment with the externally applied magnetic field; at the same time an antenna, which is typically the same as the one used by the initial pulse, is electrically connected to a receiver, which detects and measures voltages induced in the antenna by precessional rotation of the spin axes of the hydrogen nuclei.

An actual NMR measurement involves a plurality of pulses grouped into pulse sequences, most frequently of the type known in the art as Carr-Purcell-Meiboom-Gill (CMPG) pulsed spin echo sequences. As known in the art, each CPMG sequence consists of a 90-degree (i.e., $\pi/2$) pulse followed by a large number of 180-degree (i.e., $\pi$) pulses. The 90-degree pulse rotates the proton spins into the transverse plane and the 180-degree pulses generate a sequence of spin echoes by refocusing the transverse magnetization after each spin echo. A wait time interval ($T_W$) of approximately 0.5–10 sec is used first to allow for polarization of the formation by the tool's static magnetic field. Then, a CPMG pulse-echo train is executed, consisting of an excitation pulse and an alternating sequence of refocusing pulses. Following each pair of excitation pulse and a refocusing pulse, an acquisition window is applied next. Complex data points from such a pair of echo trains are co-added on an echo-by-echo basis to remove certain artifacts and to enhance the NMR signal, as known in the art. More pairs may be added to enhance the signal-to-noise ratio. The echo train, consisting of a superposition of exponentially decaying signals is then submitted to a processor, which calculates the underlying decay modes of the received NMR echo signal.

One of the key information sought from the NMR logging data is the $T_2$ decay time distribution, which is related to the pore size distribution of the rock formation. From the $T_2$ decay time distribution one can estimate, for example, the capillary bound water volume. The $T_2$ distribution is obtained by inversion of the echo train data, using well-known methods as described, for example, in U.S. Pat. No. 5,517,115 to the assignee of the present application.

It is also well-known in the art that inversion of NMR echo trains is greatly affected by noise. FIG. 1 illustrates a single-event echo train. In order to reduce the effect of noise and increase the signal-to-noise ratio (SNR), stacking of multiple echo train data is commonly used, by assuming that noise is of random nature. Thus, for example, the average echo train from 10 events is affected with much less noise than the echo train from a single event. (In general, if N is the number of stacked signals, the SNR of the averaged signal improves as approximately sqrt(N)). Various methods exist to perform stacking such as, for example, using two pulse sequences of opposite phase that cancel electronic offsets and 180-degree ringing. Such a pair of pulse sequences is called a phase-alternated pair (PAP).

In actual logging, the tool is moving at a certain speed, and echo train from each event is not collected at the same logging location or depth. When the logging speed is slow, the tool moves only a short distance. Hence one may assume that the earth formation is of nearly constant property over the short distance, and stacking of multiple events from different depths may be acceptable. However, when the logging speed is relatively fast, the tool moves over longer distances and the formation properties may change significantly over the distance. As a result, stacking of echo train data from multiple events, as generally used in the prior art, reduces apparent spatial resolution of measuremenets beyond the intrinsic resolution of the tool.

In particular, in high-signal formations (e.g., high porosity, oil-or water-filled rocks), where the logging speeds can be comparatively fast, the effective vertical resolution of the NMR log becomes dominated by the tool movement during a single PAP. For example, with a recovery time of 10 seconds between echo-trains in a PAP, with PAPs acquired at all possible frequencies, the elapsed time between the first echo-train in the first-frequency PAP and the second echo-train for the last-frequency PAP, is close to 20 seconds. At a logging speed of 900 ft/hr (15 ft/min), the MRIL tool will move approximately 5 feet during this measurement: when combined with the inherent vertical resolution of the antenna (which is approximately 2 feet), the effective vertical resolution becomes roughly 7 feet.

Enhancing the resolution of the logs is a significant problem, because subsurface formations are generally heterogeneous, so that porosity, saturation and lithology vary with position. A common example of heterogeneity is the presence in the formation of geological layers, or beds. Because logging tools have a nonzero volume of investigation, more than one layer may lie within the volume of investigation of a tool. In such cases, the petrophysical evaluation of one layer may be distorted by the presence of another layer falling within the larger volume of investigation of the tool. The above phenomenon leads to a specific problem in the analysis of subsurface formations that include one or more underground layers, especially when the layers are thin compared with the vertical resolution of the measuring tool. Such layers have become subject to significant commercial interest because of their production potential. Any knowledge about the composition and properties of such layered formations that helps better estimate their production potential has thus become increasingly valuable. It is clear therefore that any mechanism that for a given SNR supported by the formation can increase the vertical resolution of the tool without decreasing the logging speed is highly desirable.

SUMMARY OF THE INVENTION

In a preferred embodiment the present invention uses time-domain average of single event data to increase the SNR, but not stacking of data from multiple events, and hence, achieves higher spatial resolution. In accordance with the present invention, the SNR can be increased also by application of both the time-domain-average and stacking techniques. In such case, high spatial resolution can be achieved using a lesser number of stacking events. Various combinations of techniques known in the art with the teachings of the present invention are possible in this regard and will be appreciated by a person of skill in the art.

In particular, according to this invention a method for measuring an indication of attributes of materials containing a fluid state is disclosed, the method comprising the steps of: providing a time-domain signal indicative of attributes of said materials in a single measurement; constructing a time-domain averaged data train from said signal, the averaging being performed over one or more time intervals $\Delta_i$; and computing an indication of attributes of said materials from the time-domain averaged data train. In different embodiments, the time intervals $\Delta_i$ can be selected constant or different from each other. In a specific preferred embodiment of the method the time-domain signal is an NMR echo train.

In accordance with another aspect of the invention, a method for increasing the spatial resolution of NMR logging measurements is disclosed, comprising the steps of: providing an NMR echo-train indicative of attributes of materials of interest; and constructing a time-domain averaged data train from said NMR echo train, the averaging being performed over one or more time intervals $\Delta_i$. It should be understood that the method of the present invention is applicable to processing of data from virtually any type of logging device and thus is not limited to NMR logging applications.

BRIEF DESCRIPTION OF THE DRAWINGS

FIG. 1 is an illustration of a single event echo train from a NMR log;

FIG. 2 illustrates a model $T_2$ distribution and inverted $T_2$ distribution obtained from a single event echo train;

FIG. 3 illustrates multi-event echo stacking;

FIG. 4 is an illustration of a stacked echo train from ten events;

FIG. 5 illustrates an inverted $T_2$ distribution from stacked echo-train data;

FIG. 6 illustrates time-domain averaging used in accordance with the present invention;

FIG. 7 illustrates a time-domain averaged echo-train data; and

FIG. 8 illustrates an inverted $T_2$ distribution from time-domain averaged echo-train data.

DETAILED DESCRIPTION OF THE PREFERRED EMBODIMENTS

The method in accordance with the present invention will be described next in the context of NMR logging and will use terminology generally accepted in this field. It should be understood, however, that the method is equally applicable to processing of data from any number of other logging applications, and more generally to processing of data that can be modeled as an exponential function of time.

With reference to the NMR logging applications discussed above, in accordance with the present invention, the $T_2$ decay time distribution can be obtained by inverting the time-domain echo train data, assuming the following physical model:

$$S(t) = \sum_{T_2} \phi(T_2)\exp(-t/T_2) + \text{Noise}$$

where $\phi(T_2)$ is the porosity (or population) of the pores corresponding to the exponential decay time $T_2$. One such example of echo-train is plotted in FIG. 1, where the echo train is generated from the $T_2$ distribution, $\phi(T_2)$, which is illustrated in FIG. 2. Because of noise, the inverted $T_2$ distribution obtained from this single event echo-train, which is also shown in FIG. 2, is different from the model input.

To reduce the effect of random noise, it is commonly practiced to stack echo-trains from a multiple number of events. FIG. 3 illustrates the basic idea behind stacking. The top portion of the figure illustrates single-event echo train obtained from a tool moving in the direction z having a given intrinsic vertical resolution determined primarily by the dimensions of the tool. The bottom portion of the figure shows the effect of multi-event stacking, which clearly reduces the noise considerably, but also acts to change the apparent vertical resolution of the tool.

FIG. 4 shows stacked, i.e., averaged, echo trains obtained from a combination of 10 events. Significant reduction of random noise is observed, as indicated by the smooth ten-event average line. The inverted $T_2$ distribution from the 10 event stacked echo train is closer to the model input, as illustrated in FIG. 5.

As indicated in FIG. 3, stacking of multiple event data causes worsening of the spatial resolution of NMR logging, as the tool is moving in usual logging measurements. As noted above, the tool moves a considerable distance at high logging speeds. It should be apparent that the formation property may change significantly over the distance. While single-event echo-train data provides information of the formation properties for an interval determined by the intrinsic spatial resolution of the tool, the stacked echo train data provides formation property average over the distance to cover such multiple events. As a result, the spatial resolution of the measurement is greatly reduced beyond the intrinsic resolution of the tool.

In accordance with the present invention, the signal-to-nose ratio (SNR) can be increased without stacking echo train data from multiple events (or by using reduced stacking) and thus without worsening the spatial resolution at high logging speeds, but by taking time-domain-average(s) of the input signal. The principal advantage of this approach is therefore that the spatial resolution of the tool over the coarse of a logging experiment is not worsened at the price of the resolution in the time domain.

With reference to the notations in FIG. 3. the time-domain approach to enhancing vertical resolution of data logs in accordance with the present invention is illustrated in FIG. 6. In particular, in accordance with the present invention the following approach is used. First, construct a time domain averaged echo train as follows: for time t, take an average of echos over a time interval $\Delta$, as defined by the following expression:

$$S_\Delta(t) = \int_t^{t+\Delta} dt' S(t')/\Delta$$

It is important to note that the noise in the averaged echo is still random. To ensure that, the averaged echo separated by time interval of $\Delta$ is considered. Namely, the averaged echo train at $t=t_0, t_0+\Delta, t_0+2\Delta, \ldots, t_0+N\Delta$ is used to obtain $T_2$ distribution. FIG. 7 shows such a time-domain averaged echo train averaged over 10 sampling points. In this example, the single echo train has 300 data points at $t/T_E=1, \ldots, 300$ (with $T_E=1.2$ ms). As $\Delta=12$ ms (10 sampling points), the averaged echo has 30 (=300/10) data points. The inverted $T_2$ distribution obtained from this time-domain-averaged echo is closer to the model input than the one from a single echo, as illustrated in FIG. 8. Note that the following equation is used to estimate $T_2$ distribution:

$$S_\Delta(t) = \sum_{T_2} \phi(T_2)\exp(-t/T_2)(1-\exp(-\Delta/T_2)) + \text{Noise}$$

It should be apparent that in different applications the value of the parameter $\Delta$ can be changed to conform with the underlying physics of the signal. Furthermore, in alternative embodiments of the invention, instead of a single time period $\Delta$, one can use two or more periods $\Delta_i$ the values of which can generally be different. As in the preceding case, the values for $\Delta_i$ can be selected dependent on the practical application and in particular on the need to increase the SNR of the received signal.

In accordance with another aspect of the present invention, stacking of multiple-event echo-train data and time-domain averaging can be used in combination. For instance, instead of taking 10-event stacking or time-domain averaging over 10 sampling points, one can use 5-event stacking and then apply time-domain averaging to increase the SNR of the signal, without worsening the vertical resolution of the log as much as prior art methods would, which only use stacking.

It should be noted that while the method of the present invention has been described in the context of NMR logging, it is applicable to a multitude of practical applications which need not be limited to NMR logging. Virtually all types of logging measurements with relatively low SNR signals can be enhanced using the method outlined above, without unduly compromising the vertical resolution of the moving tool. It should be apparent that various combinations of prior art measurement methods and techniques can be used along with the time-domain averaging approach of the present invention. It should also be clear to those skilled in the art that the approach used in accordance with the present invention can also be used in measuring properties of samples of porous materials in a laboratory setting, as well as in situ logging-type including logging/measuring while drilling (LWD/MWD) measurements. The use of the method alone or in combination with other techniques, as discussed above is believed to be a significant contribution to the art of logging with wide ranging applications involving virtually all tools, and a broad range of practical applications, including logging while drilling.

While the invention has been described with reference to the preferred embodiments, it will be appreciated by those of ordinary skill in the art that modifications can be made to the structure and form of the invention without departing from its spirit and scope which is defined in the following claims.

What is claimed is:

1. A method for measuring an indication of attributes of materials containing a fluid state, the method comprising the steps of:

a. providing an NMR, echo train indicative of attributes of said materials;
b. constructing a time-domain averaged data train from said signal, the averaging being performed over two or more time intervals $\Delta_i$, wherein at least two of said two or more time intervals $\Delta_i$ are different; and
c. computing an indication of attributes of said materials from the time-domain averaged data train.

2. The method of claim 1 herein the following expression is used to construct the time-domain averaged data train within a $\Delta_i$, time interval:

$$S_{\Delta_i} = \int_t^{t+\Delta_i} dt' S(t')/\Delta_i,$$

where S(t) is the provided time-domain signal.

3. The method of claim 1, wherein a portion of the time-domain averaged data train is constructed at times $t=t_0$, $t_0+\Delta_i$, $t_0+2\Delta_i$, ..., $t_0+N\Delta_i$.

4. The method of claim 1, wherein the step of computing an indication of attributes is performed using inversion of the constructed time-domain averaged data train into $T_2$ domain.

5. The method of claim 4, wherein the $T_2$ distribution is estimated using the following expression $$S_{\Delta_i}(t) = \sum_{T_2} \phi(T_2)\exp(-t/T_2)(1 - \exp(-\Delta_i/T_2)) + Noise,$$

where $\phi(T_2)$ is the porosity corresponding to the exponential decay time $T_2$.

6. The method of claim 1 further comprising the step of averaging two or more constructed time-domain averaged data trains to increase the signal-to-noise ratio (SNR) of the measurement.

7. A method for measuring an indication of attributes of materials containing a fluid state in a formation surrounding a borehole, comprising the steps of:
a. providing a single NMR echo-train indicative of attributes of materials in the formation surrounding the borehole;
b. constructing a single time-domain averaged data train from said NMR echo train, the averaging being performed over two or more time intervals $\Delta_i$, wherein at least two of said two or more time intervals $\Delta_i$ are different; and
c. computing an indication of attributes of said materials from the time-domain averaged data train.

8. The method of claim 7 further comprising the step of averaging two or more constructed time-domain averaged data trains to increase the signal-to-noise ratio (SNR) of the measurement.

9. The method of claim 7 wherein the following expression is used to construct the time-domain averaged data train:

$$Echo_{\Delta_i}(t) = \int_t^{t+\Delta_i} dt' Echo(t')/\Delta_i,$$

where Echo(t) is the provided time-domain signal over a time interval $\Delta_i$.

10. The method of claim 7, wherein a portion of the time-domain averaged data train is constructed at times $t=t_0$, $t_0+\Delta_i$, $t_0+2\Delta_i$, ..., $t_0+N\Delta_i$.

11. The method of claim 10, wherein the step of computing an indication of attributes is performed using inversion of the constructed time-domain averaged data train into $T_2$ domain.

12. The method of claim 11, wherein the $T_2$ distribution is estimated using the following expression $$Echo_{\Delta_i}(t) = \sum_{T_2} \phi(T_2)\exp(-t/T_2)(1 - \exp(-\Delta_i/T_2)) + Noise,$$

where $\phi(T_2)$ is the porosity corresponding to the exponential decay time $T_2$.

13. A method for increasing the spatial resolution of NMR logging measurements, comprising the steps of:
a. providing a single NMR echo-train indicative of attributes of materials of interest; and
b. constructing a single time-domain averaged data train from said single NMR echo train, the averaging being performed over two or more time intervals $\Delta_i$, wherein at least two of said two or more time intervals $\Delta_i$ are different.

14. The method of claim 13 further comprising the step of averaging two or more constructed time-domain averaged data trains to increase the signal-to-noise ratio (SNR) of the measurement.

15. The method of claim 13 wherein the following expression is used to construct the time-domain averaged data train:

$$Echo_{\Delta_i}(t) = \int_t^{t+\Delta_i} dt' Echo(t')/\Delta_i,$$

where Echo(t) is the provided time-domain signal.

16. The method of claim 13, wherein the time-domain averaged data train is constructed at times $t=t_0$, $t_0+\Delta_i$, $t_0+2\Delta_i$, ..., $t_0+N\Delta_i$.

17. The method of claim 16, wherein the step of computing an indication of attributes is performed using inversion of the constructed time-domain averaged data train into $T_2$ domain.

18. The method of claim 17 wherein the $T_2$ distribution is estimated using the following expression $$Echo_{\Delta_i}(t) = \sum_{T_2} \phi(T_2)\exp(-t/T_2)(1 - \exp(-\Delta_i/T_2)) + Noise,$$

where $\phi(T_2)$ is the porosity corresponding to the exponential decay time $T_2$.

19. A method for real-time processing of NMR logging signals, comprising the steps of:
a. providing real-time data corresponding to a single NMR echo-train indicative of physical properties of materials of interest;
b. constructing a time-domain averaged data train from said NMR echo train, the averaging being performed over variable time interval $\Delta$ using the expression $$S_\Delta(t) = \int_t^{t+\Delta} dt' S(t')/\Delta,$$

where $S(t)$ is the provided measurement signal, and the time-domain averaged data train is constructed at times $t=t_0$, $t_0+\Delta$, $t_0+2\Delta$, ..., $t_0+N\Delta$; and c. computing in real time an indication of the physical properties of said materials based on the constructed time-domain averaged data train.

20. The method of claim 19, further comprising the step of: inverting of the constructed time-domain averaged data train into the $T_2$ domain, wherein the $T_2$ distribution is modeled using the expression $$Echo_\Delta(t) = \sum_{T_2} \phi(T_2)\exp(-t/T_2)(1 - \exp(-\Delta/T_2)) + Noise,$$

where $\phi(T_2)$ is the porosity corresponding to the exponential decay time $T_2$.

21. The method of claim 19, further comprising the step of averaging two or more constructed time-domain averaged data trains to increase the signal-to-noise ratio (SNR) of the measurement.

\* \* \* \* \*